United States Patent [19]

Bratten

[11] Patent Number: 5,307,551
[45] Date of Patent: May 3, 1994

[54] METHOD OF INSTALLING A FILTER BELT ON A FILTER HOUSING MOUNTED ROLLER

[76] Inventor: Jack R. Bratten, 5970 St. James Dr., West Bloomfield, Mich. 48322

[21] Appl. No.: 12,898

[22] Filed: Feb. 3, 1993

Related U.S. Application Data

[62] Division of Ser. No. 766,182, Sep. 27, 1991, Pat. No. 5,209,841.

[51] Int. Cl.⁵ .................. B23P 11/00; B65H 75/28; F16B 3/04
[52] U.S. Cl. ..................... 29/434; 29/451; 29/902; 242/74; 403/357
[58] Field of Search .......... 29/434, 451, 902; 210/387, 400, 783, DIG. 3; 242/74; 403/356, 357; 492/45

[56] References Cited

U.S. PATENT DOCUMENTS

| | | | |
|---|---|---|---|
| 1,757,241 | 5/1930 | Forse | 242/74 |
| 2,204,928 | 6/1940 | Culver | 242/74 |
| 3,437,210 | 4/1969 | O'Neill | 210/387 |
| 3,802,638 | 4/1974 | Dragan | 242/74 |
| 4,026,485 | 5/1977 | Ambrose | 242/74 X |
| 4,213,578 | 7/1980 | Katata | 242/74 |

*Primary Examiner*—Mark Rosenbaum
*Assistant Examiner*—S. Thomas Hughes
*Attorney, Agent, or Firm*—John R. Benefiel

[57] ABSTRACT

A method of installing a filter belt onto each of a pair of wind up rollers disposed on either side of a filter housing is disclosed. The filter belt is detachably secured at either end to a respective roller by a sewn in flexible element received in an undercut groove in the roller surface. Each end of the belt is fully inserted lengthwise into the undercut groove in the respective roller surface while bending the flexible element around side plates of the filter housing so as to secure each end of the filter belt to a respective roller.

1 Claim, 4 Drawing Sheets

സ്റ്റ്5,307,551

METHOD OF INSTALLING A FILTER BELT ON A FILTER HOUSING MOUNTED ROLLER

CROSS REFERENCE TO RELATED APPLICATIONS

This application is a Divisional of U.S. Ser. No. 07/766,182, filed on Sep. 27, 1991, now U.S. Pat. No. 5,209,841.

BACKGROUND OF THE INVENTION

This invention concerns filters of a type including a movable filter belt disposed within a pressurized filter chamber during filtration of a liquid in the chamber, the filter belt advanced out of the chamber after a filter cycle to enable removal of the solids or "cake" accumulating on the top of the belt over the course of the cycle.

The present inventor has heretofore been granted U.S. Pat. Nos. 4,430,231 and 4,568,460 on this type of filter, featuring a filter housing of fixed construction having elongated openings at either end accommodating the entrance and exit of the filter belt, with inflatable hose seals used to establish a seal above to withstand the relatively high pressure existing in the filter chamber during a filter cycle.

Prior filters of this type were constructed with separable housing sections which were clamped against the filter on four sides to establish sealing of the filter chamber.

In the patented filter, the side edges of the filter belt had to be sealed to prevent bypass flow around the lateral edges of the belt during filtering. The filter belt rests on a perforated plate having solid side borders against which the filter belt was pressed by the chamber pressure, the filter belt having impervious edges to effect this result.

In the prior filters of this type the usual practice was to stack a number of filters vertically, and a continuous belt was circulated through the chamber of each filter in zig zag fashion, with a complex guidance and drive mechanism required, and significant down time involved in changing a belt.

Accordingly, U.S. Pat. No. 4,568,460 discloses and claims an independent belt arrangement for each filter unit, in which upper and lower segments of an endless belt overlie the perforated plate and liquid flow passes through both segments. The belt is advanced after each filter cycle to transport the accumulated solids out of the filter chamber for disposal preparatory to the next filter cycle.

This design is a simplified arrangement which represents a substantial advance over the prior single belt designs, but nonetheless has certain drawbacks.

Firstly, the belt design requires overlapping segments of different widths to achieve end sealing, increasing the cost of the filter belt. The doubling of the filter belt layers increases the wearout rate, necessitating more frequent belt replacement.

The double overlapped edges also reduces slightly the width available for filtering action.

All of the endless filter belt designs require careful alignment and/or special devices to insure proper tracking of the filter belt over the support and drive rollers. Mistracking is aggravated when uneven loading of the belt occurs, as when solids accumulate more on one or the other side of the belt.

The cycle time is significantly extended in the endless belt arrangements by the need to readvance the same section of the filter belt back into position in the chamber after each movement of the belt out of the chamber at the end of the cycle.

SUMMARY OF THE INVENTION

The present invention comprises an improved filter belt arrangement for an inflated seal closed chamber belt filter of the type described in the above cited U.S. patents which does not involve an endless belt or doubled together filter belt segments, to simplify the filter belt alignment requirements and increase the filter belt life.

The filter belt arrangement according to the present invention involves a reversing belt drive which alternately shifts a plurality of separate sections of a fixed length of the filter belt either into a position in the housing filter chamber or in a partially wound of condition on a respective one of a pair of rollers. Each roller is located on an opposite side of the filter parallel to and aligned with a respective entrance opening to the filter chamber.

The rollers are alternatively driven and idled in reverse directions after alternate filter cycles so as to position either of the two separate sections of the belt over the support plate underlying the filter chamber.

A revolution counter associated with one or both of the rollers is advantageously employed to cause the appropriate filter belt sections to be accurately positioned in the filter housing at the beginning of each filter cycle.

The accumulated cake is scraped from the exiting filter belt segment as it is wound on its roller, with the housing seals inflated and the next cycle initiated as soon as the trailing belt section is in position to shorten the cycle time by eliminating the need to advance the same filter belt section back into the filter housing.

Washing jets are positioned to clean the upper and lower surfaces of the previously wound up belt section as it is again pulled back into the filter housing in the next filter cycle.

The sides of the belt are each provided with an impregnated edge, as of urethane plastic pressed into the belt fabric to create a durable, liquid impermeable lateral edge which will seal against the solid areas of the support plate when the filter chamber is pressurized.

The filter belt is attached at either end to a respective drive-take up roller by a sewn-in elongated flexible key element received in a lengthwise undercut slot, allowing one step assembly of the belt to each roller, the flexible key element accommodating bending of the filter end to clear the side structure.

This arrangement avoids tracking problems by the reversing of the belt, since there is no cumulative mispositioning of the belt.

Since different sections of the belt are used, the life of the belt is multiplied, and elimination of the double layer reduces the rate of wear of the belt material.

The cycle time is reduced since a new section is advanced into the chamber simultaneously with withdrawal of the section used in the previous cycle.

DETAILED DESCRIPTION

Figure 1:
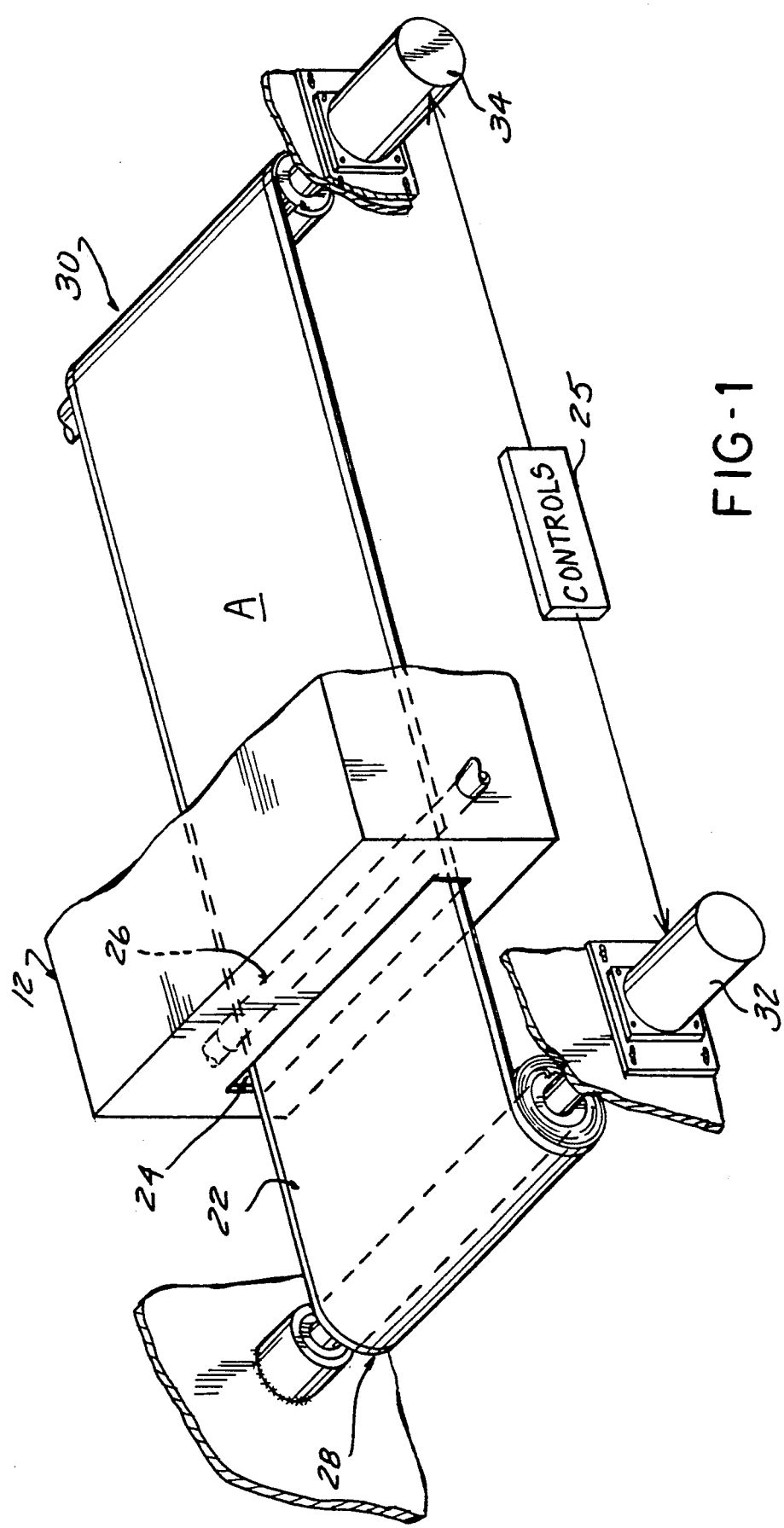
FIG. 1 is a perspective diagrammatic view of the filter unit and filter belt arrangement according to the invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the Figures, the present invention comprises filter belt arrangements for pressurized liquid filter units 10 of a type described in U.S. Pat. Nos. 4,430,231 and 4,568,460. Such filter units 10 will not be described herein in complete detail as they are so described in the aforementioned U.S. patents, but include a rigid filter housing 12 defining a filter chamber 14 adapted to receive a liquid to be filtered via inlet means 16.

A support plate 18 having a pattern of through openings separates the filter chamber 14 from a collection chamber 20 lying beneath the filter chamber 14. A filter belt 22 enters and exits the filter housing 12 via elongated openings 24 at opposite ends of the filter housing 12. The filter belt 22 is of a woven construction creating minute filter openings, and overlies the support plate 18 so that liquid to be filtered passes through the filter belt 22 and thence through the openings in the support plate 18 to the collection chamber 20. Outlet means 27 directs the filtered liquid to be returned to the system utilizing the liquid.

In order to seal off the filter chamber 14 during a filter cycle, an elongated inflatable seal 26 extends across each housing opening 24 and out through openings in the opposite sidewalls of the housing 12. The seals 26 are inflated upon command of the system controls 25 with a fluid so as to completely seal the filter chamber 14.

A suitable control system for operation of the basic filter is described in U.S. Pat. No. 4,861,494 issued on Aug. 29, 1989 for an "Automatic Cycle Control Arrangement and Method for a Pressure Filter". The filter may also include other components such as a dewatering diaphragm, not described here, but which is described in the U.S. patents referenced above.

The belt arrangement according to the present invention comprises a single layer filter belt 22 of a fixed length, and a first and second drive-take up roller 28, 30, each located parallel to and adjacent a respective housing opening 24 to be substantially aligned therewith. The filter belt 22 is attached at either end to each roller 28, 30 so as to be able to be wound up alternately on one of the first and second rollers 28, 30.

The drive-take up rollers 28, 30 are adapted to alternatively be driven in opposite directions by drive means actuated by the control system 28.

Figure 2:
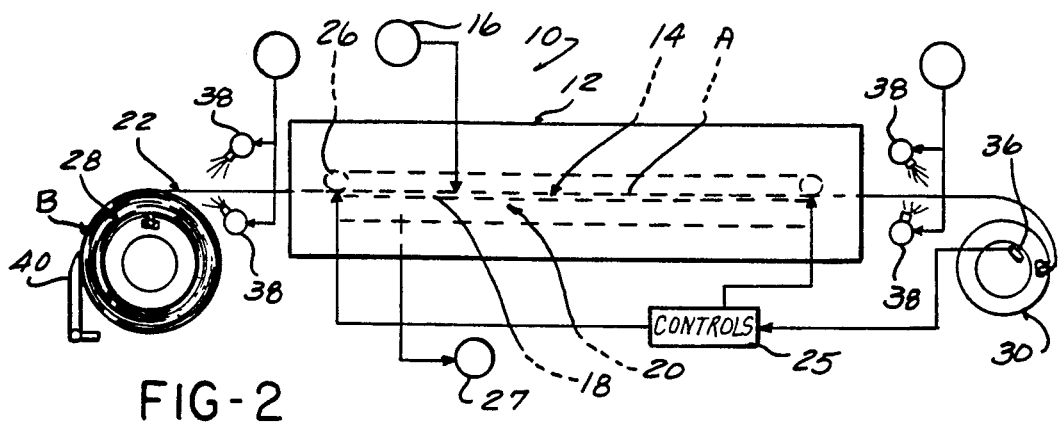
FIG. 2 is a diagram of a side view of a filter unit with a filter belt arrangement according to the present invention, showing a first filter belt section in position in the filter housing and a second section wound up on one of the drive take up rollers.
Figure 3:
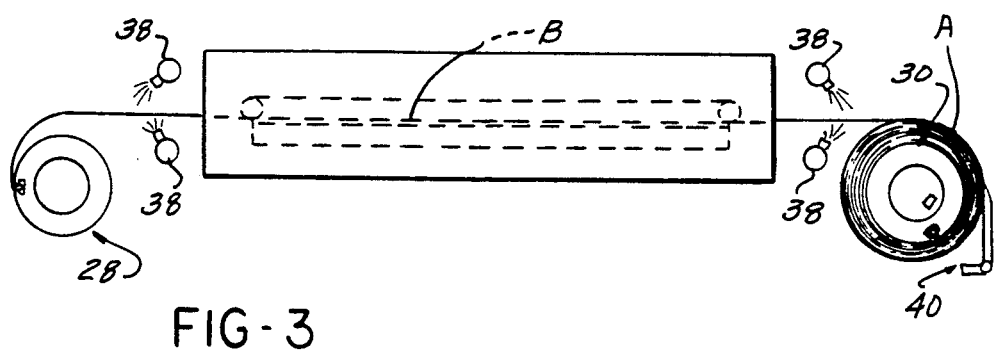
FIG. 3 is a diagram of the filter unit and filter belt arrangement shown in FIG. 2 with the second section in position in the filter housing and the other section wound up on the other drive take up roller.

The filter belt 22 is of a fixed length such that either of two separate sections A and B can alternately be positioned in the filter chamber 14, while the other is wound on one of the rollers 28 or 30. This allows alternate use of a single belt by reversing the direction of movement of the filter belt 22 out of (or into) the filter chamber 14. The first roller 28 is driven so as to draw the filter belt 22 to the left, and wind up the filter belt 22 as shown in FIG. 2, disposing the section A int he filter chamber 14. After the cycle is completed, the roller 30 is driven so as to wind up the section A, disposing the unwound section B in the filter chamber 14, as indicated in FIG. 3.

A drive motor 32, 34 is associated with each drive-take up roller 28, 30, alternately activated by the system controls 25. A revolution counter 36 is associated with one of the roller 30, which provides a signal to the system controls 25 to control the drive motors 32, 34 to enable sections A or B to be properly located in the housing 12 at the beginning of each filter cycle. The drive motors 32, 34 are preferably hydraulic motors which can be controllably retarded to enable controlled unwinding as the other motor is driven.

An array of washer jets 38 are disposed above and beneath the filter belt 22 at the point of exit from the housing openings 24. These jets 38 are directed away from the openings 24. The filter cake is scraped from the surface of the filter belt 22 as the section A or B is wound onto roller 28 or 30 by means of scraper bars 40. Washing occurs as the filter belt 22 is advanced back into the housing 12 preparatory to a new filter cycle.

Figure 4:
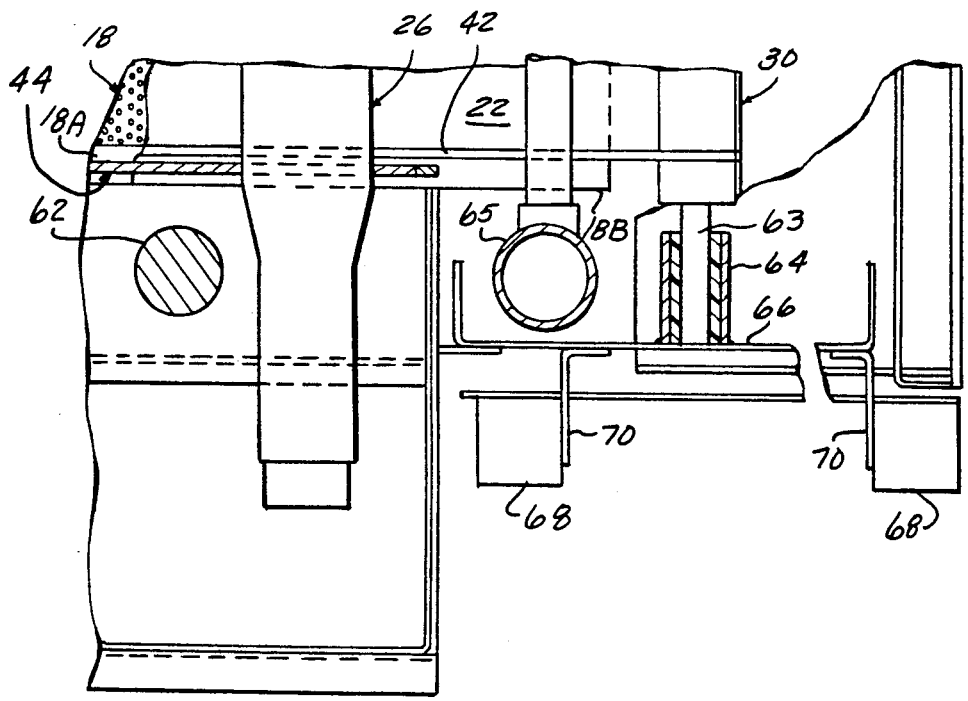
FIG. 4 is a fragmentary plan view in partial section of a corner of a filter unit and associated components of the filter belt arrangement.

FIG. 4 shows that the support plate 18 has a central region formed with a hole pattern that is bordered by a solid area 18A which exists along either side although only one side is shown in FIG. 4. These areas are overlain by an edge 42 of the filter belt 22 which is impregnated with a plastic such as urethane so as to be impervious to the flow of liquid. This treatment is preferably carried out by use of a hot press, forcing the urethane, into the fabric which has been brushed on in liquid form, which press also cures the urethane. This results in treated edges 42 which are not appreciably thicker than the filter belt itself and which cannot become loose, as can happen with adhesively bonded coatings.

Only a single layer of the filter belt 22 receives the liquid flow, as contrasted with the arrangement described in U.S. Pat. No. 4,568,460. This single layer allows for better sealing and narrower border areas for sealing. However, a more open support plate 18 must be employed than in the prior design, since there is a reduced lateral flow through a single belt over that in the double filter belt layer of the prior design. A 40% open area has been determined to be adequate, obtained by increasing the number of openings in the support plate 18.

The inflatable seals 26 pass through openings in side walls 44 welded to the support plate 18 and to a floor pan 46 defining the bottom of the collection chamber 20 of the next above filter unit 10B.

Figure 5:
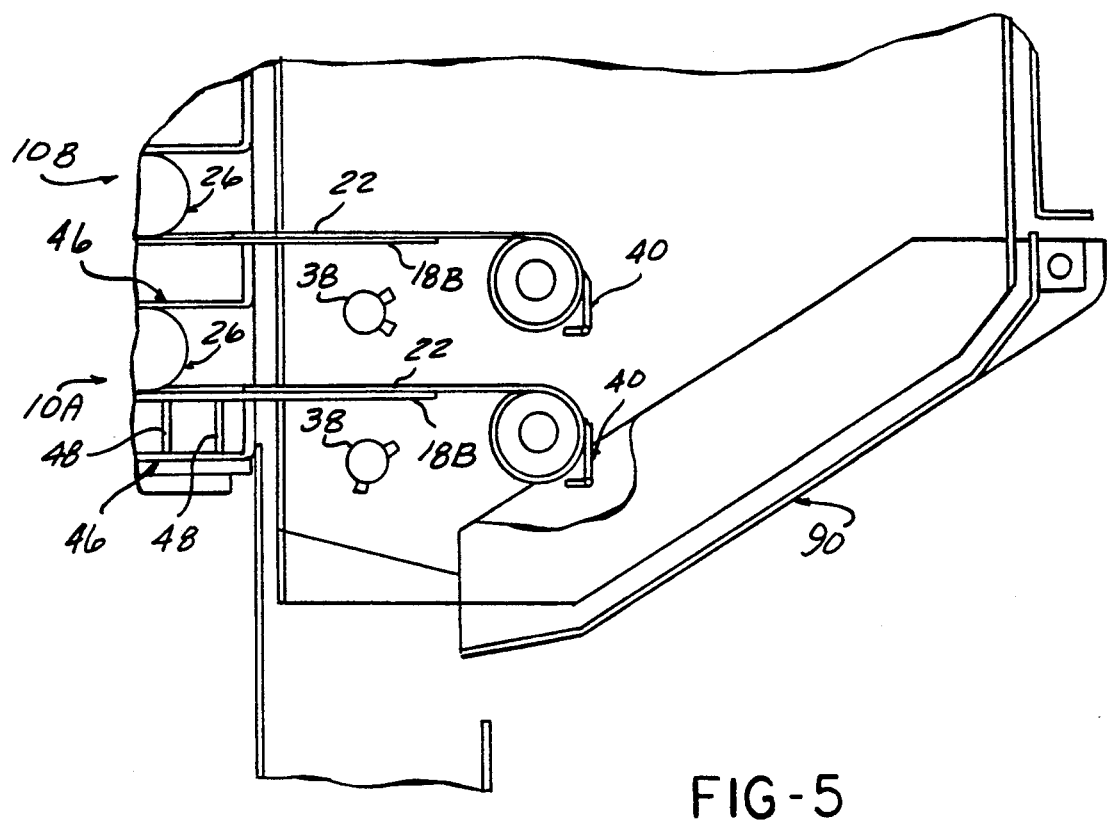
FIG. 5 is a fragmentary front elevational view in partial section of the corner of the filter unit and associated filter belt arrangement components shown in FIG. 3, showing a plurality of filter units in a vertical stack.

As seen in FIG. 5, the support plate 18 is itself supported by a series of spaced apart parallel bars 48 extending from side to side beneath the support plate 18 and above the floor pan 46. The spaces between the bars 48 define the collection chamber 20 which open out over a side surface 47 defined by the projecting lowermost floor pan 46, which extends to a collection trough 49, repeated on the other side, receiving the filtered liquid for recirculation to the utilizing system.

The lowermost filter unit 10A is supported on a heavy lower frame 50 made up of a weldment of T-beams 52 and plates 54, 56, 58, 60 and series of large diameter tie bolts 62 pass through the lower frame 50 and to an similar upper frame (not shown). This construction resists the large unbalanced forces created by the internal pressures in filter chambers 14. These pressures are balanced for the most part except at the top and bottom, but if there are large filter areas, the forces are considerable and require a heavy frame to resist.

A vertical manifold pipe 65 for the washing jets 38 is mounted between each roller 28, 30 and the housing 12 (FIG. 4). The support plate 18 has a portion 18B which projects out of the housing 12 to partially span the gap and provide a support for the filter belt 22 so as to prevent sagging when heavily loaded with filter cake.

The rollers 28, 30 are mounted spaced from the housing 12. The right hand roller 30 is shown in FIG. 4, having a reduced diameter end 63 supported in a bearing sleeve 64.

Bearing sleeve 64 is welded to a side member 66 supported on posts 68 by brackets 70.

Figure 8:
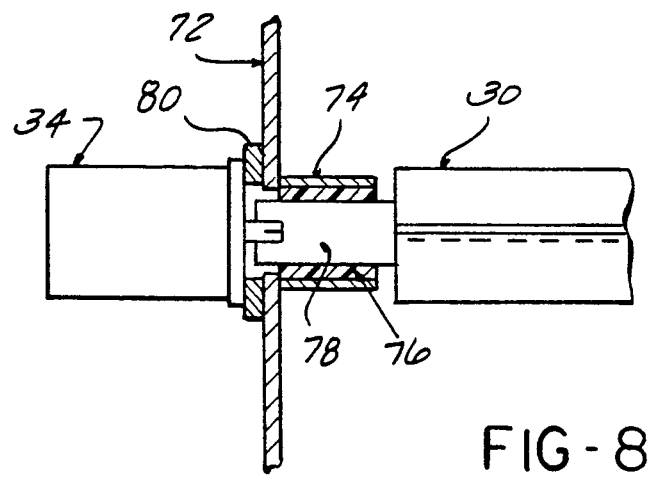
FIG. 8 is an enlarged detail sectional view of a drive motor and one end of a drive-take up roller.
Figure 9:
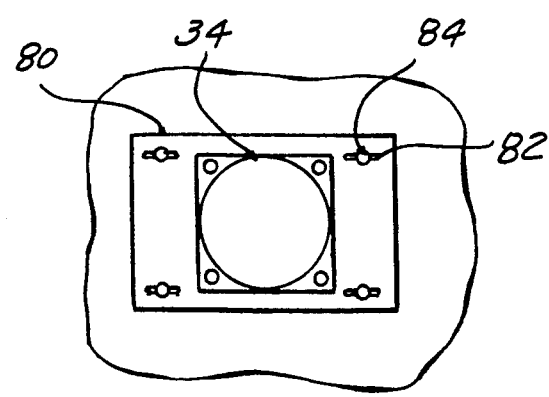
FIG. 9 is an end view of the drive motor shown in FIG. 7.

A similar construction on the other end of the rollers 28, 30, is shown in FIGS. 8 and 9, in which a side member 72 supports a bearing housing sleeve 74 mounting a bearing 76 receiving a reduced end 78 of the roller 30.

Hydraulic drive motor 34 is mounted to the member 74 and has output keyed to the roller end 78 to establish a rotary connection.

An adjustment plate 80 may be mounted with elongated holes 82 and bolts 84 to allow alignment of the rollers 28, 30 for accurate tracking of the filter belt 22.

Figure 7:
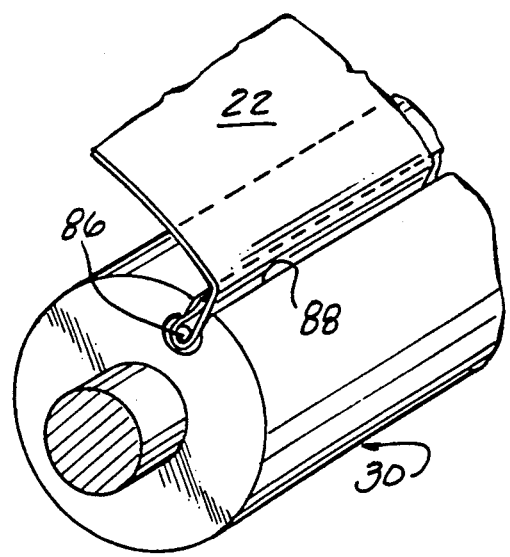
FIG. 7 is an end view of a drive-take up roller with one end of the filter belt installed therein.

The presence of the closely positioned side members 66, 72 limits lateral access to the rollers 28, 30. A special attachment shown in FIG. 7 is utilized for attaching either end of the filter belt 22 to a respective roller 28, 30 which allows ready replacement without the use of separable hardware items or dismantling of the filter. This attachment means comprises an elongated flexible element 86 such as a length of small diameter round neoprene shape which is sewn into a pocket at each end of the filter belt 22. Each roller 28, 30 is formed with an undercut slot 88 extending the length thereof and sized to receive the filter belt end with the sewn in flexible element 86 so as to be securely retained therein. The belt may be advanced into the slot 88 from the side, the belt being able to be guided around the side members 66, 72 as necessary by the freely bendable flexible element 86 so that no dismantling is required.

As shown in FIG. 5, a swinging deflector chute 90 may be positioned to collect wash liquid during washing in trough 44 for recirculation for reuse in the utilizing systems and then swing away to allow filter cake to drop into a conveyor (not shown) during scraping of the belt.

The back and forth motion of the filter belt has been found to eliminate mistracking problems. The use of two sections alternately increases the filter belt life, which is further enhanced by elimination of any rubbing of overlapped filter sections against each other. The cycle time is reduced by the immediate positioning of a fresh section in the chamber as a loaded section is advanced out of the filter chamber.

The rollers 28, 30 can be constructed of standard shafting stock, which is quite precisely sized so that accurate windup and drive rollers can be fabricated at relatively low cost.

The attachment means allows easy and rapid replacement of the filter belt without separate hardware items to minimize downtime.

Rather than only two sections alternately positioned in the housing, additional section should be employed by winding up sufficient additional lengths of filter belts, with suitable controls to correctly position each separate section in the housing.

I claim:

1. A method of attaching a filter belt to each of a pair of wind up rollers disposed on either side of a filter housing, said rollers each formed with a lengthwise slot extending completely across each of said rollers, each slot shaped to define a reduced width at the surface of each roller, said filter housing including side members closely positioned on either side of at least one of said rollers to endwise limit access thereto, the method comprising the steps of:

sewing an elongated freely flexible element into a pocket at each end of said filter belt;

sizing said flexible element and pocket so as to be able to be inserted into a respective slot from the end of a respective roller and retained therein by said reduced width thereof; and fully inserting each pocket and sewn in freely flexible element lengthwise into a slot of a respective roller from the end thereof while bending said freely flexible element around said filter housing side members and into said slot, to secure each end of said filter belt to a respective roller.

* * * * *

UNITED STATES PATENT AND TRADEMARK OFFICE
CERTIFICATE OF CORRECTION

Page 1 of 2

PATENT NO. : 5,307,551
DATED : May 3, 1994
INVENTOR(S) : Jack R. Bratten

It is certified that error appears in the above-identified patent and that said Letters Patent is hereby corrected as shown below:

Column 1, line 23, "above" should be --able--.

Column 1, line 55, "end" should be --edge--.

Column 2, line 17, "of" should be --up--.

Figure 6:
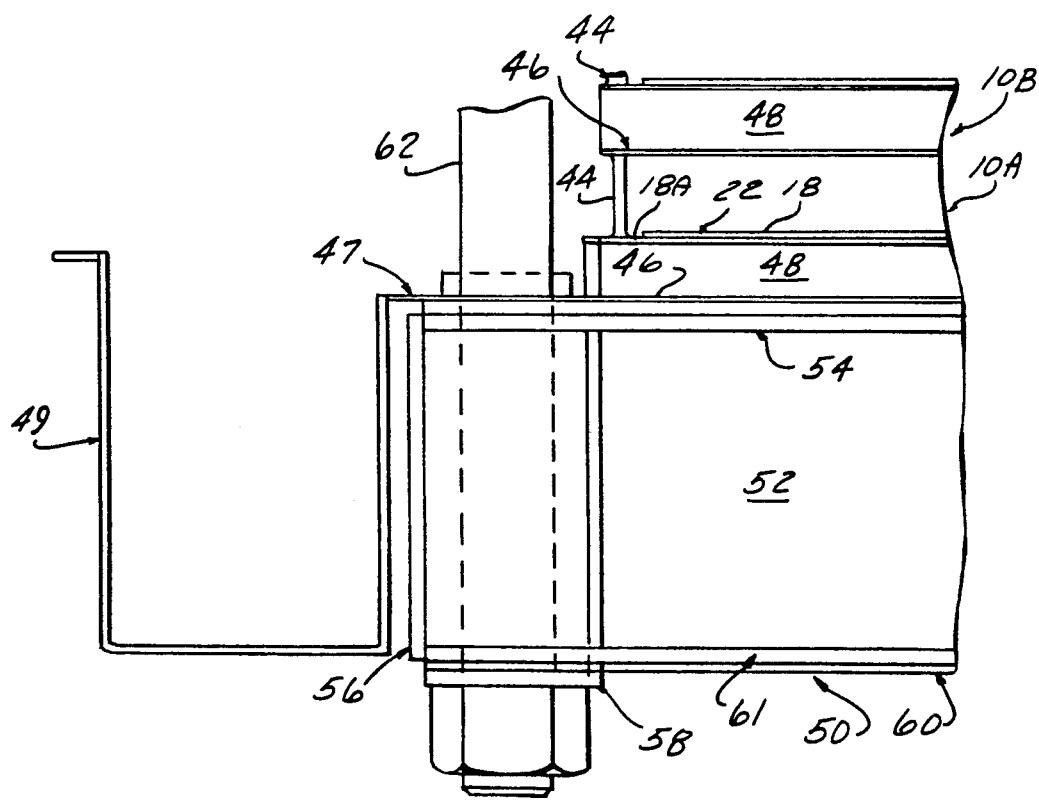

Column 3, line 14-15, the description of FIGURE 6 has been omitted:

--FIGURE 6 is a fragmentary side elevational view of the filter unit corner shown in Figures 3 and 4, showing a plurality of vertically stacked filter units.--

Column 4, line 17, "int he" should be --in the--.

Column 4, line 25, "roller" should be --rollers--.

Column 5, line 11, "T-" should be -- I- --.

UNITED STATES PATENT AND TRADEMARK OFFICE
CERTIFICATE OF CORRECTION

PATENT NO. : 5,307,551
DATED : May 3, 1994
INVENTOR(S) : Jack R. Bratten

It is certified that error appears in the above-indentified patent and that said Letters Patent is hereby corrected as shown below:

Column 6, line 27, "section should" should be -- sections could --.

Signed and Sealed this

Thirtieth Day of August, 1994

BRUCE LEHMAN

Attest:

Attesting Officer

Commissioner of Patents and Trademarks